Figure 1:
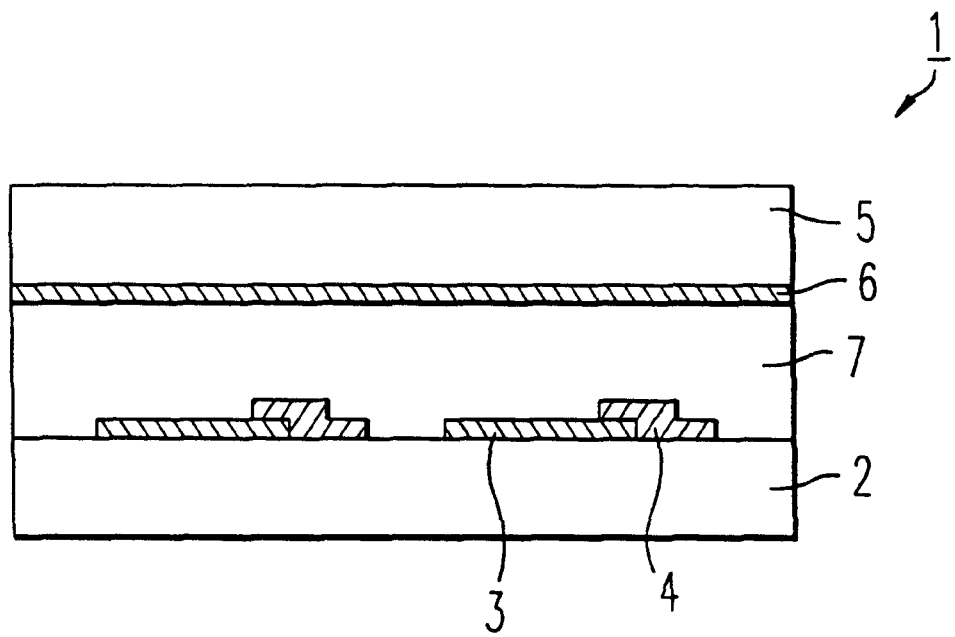

United States Patent
Fujino et al.

[11] Patent Number: 6,017,466
[45] Date of Patent: *Jan. 25, 2000

[54] LIQUID CRYSTAL OPTICAL ELEMENT, LIQUID CRYSTAL DISPLAY ELEMENT AND A PROJECTION TYPE LIQUID CRYSTAL DISPLAY APPARATUS

[75] Inventors: Yohsuke Fujino; Satoshi Niiyama; Yoshinori Hirai, all of Yokohama, Japan

[73] Assignee: AG Technology Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/673,313

[22] Filed: Jun. 28, 1996

[30] Foreign Application Priority Data

Jun. 30, 1999 [JP] Japan ................................. 7-166053

[51] Int. Cl.[7] ............................. C09K 19/52; G02F 1/13
[52] U.S. Cl. ........................... 252/299.01; 349/5; 349/86; 349/93; 348/790
[58] Field of Search ........................ 428/1.1; 252/299.01; 349/86, 93, 5; 348/761, 790

[56] References Cited

U.S. PATENT DOCUMENTS

| | | |
|---|---|---|
| 4,834,509 | 5/1989 | Gunjima et al. . |
| 5,103,327 | 4/1992 | Hirai et al. . |
| 5,150,232 | 9/1992 | Gunjima et al. . |
| 5,196,952 | 3/1993 | Hirai et al. . |
| 5,216,531 | 6/1993 | Hirai et al. . |
| 5,235,445 | 8/1993 | Hirai et al. . |
| 5,331,446 | 7/1994 | Hirai et al. ................................. 349/5 |
| 5,379,137 | 1/1995 | Hirai et al. ................................ 349/86 |
| 5,386,306 | 1/1995 | Gunjima et al. . |
| 5,455,083 | 10/1995 | Noh et al. ................................... 428/1 |
| 5,776,364 | 7/1998 | Niiyama et al. .................... 252/299.01 |

FOREIGN PATENT DOCUMENTS

| | | |
|---|---|---|
| 0 272 585 | 6/1988 | European Pat. Off. . |
| 0 509 534 | 10/1992 | European Pat. Off. . |

OTHER PUBLICATIONS

Chemistry of Polymer Material, Applied Chemistry Series No. 4, pp. 79–85, Shohei Inoue, et al., May 25, 1982 (with English translation).

*Primary Examiner*—Shean C. Wu
*Attorney, Agent, or Firm*—Oblon, Spivak, McClelland, Maier & Neustadt, P.C.

[57] ABSTRACT

A liquid crystal optical element comprising a pair of substrates with electrodes and a liquid crystal/polymer composite material interposed between the pair of substrates wherein polymer which constitutes a polymer phase has a maximum value of 20° C. or less in the temperature dependence of the loss dielectric constant (a frequency for measurement=100 Hz).

13 Claims, 2 Drawing Sheets

LIQUID CRYSTAL OPTICAL ELEMENT, LIQUID CRYSTAL DISPLAY ELEMENT AND A PROJECTION TYPE LIQUID CRYSTAL DISPLAY APPARATUS

The present invention relates to a liquid crystal optical element in which a composite material including liquid crystal and a polymer is interposed between a pair of substrates with electrodes, a liquid crystal display element and a projection type liquid crystal display apparatus using such liquid crystal display element.

In recent years, liquid crystal displays have been widely used for personal word processors, hand-held computers, portable TV sets and so on by making use of advantages of low consumption rate of power, low voltage driving and so on. Of these liquid crystal displays, liquid crystal display elements having active elements which are excellent in viewing angle, of high speed response and capable of high density display, have particularly been noted and developed.

At the beginning, liquid crystal display elements (LCDs) of dynamic scattering type (DSM) have been proposed. However, such DSM-LCDs had a disadvantage of large current consumption because a high value of electric current passed in the liquid crystal. Now, LCDs of twisted nematic type (TN) using a polarizing plate have been widely used in markets as display elements for portable TVs or portable type information devices. Since TN-LCDs have a very small leak current and a small power consumption rate, they are suitable for usage in which batteries are used as power sources.

In order to solve such problem, there has been proposed a liquid crystal/polymer composite material comprising a nematic liquid crystal dispersed and held in a matrix of polymer or a composite body comprising a continuous liquid crystal phase and a network-like polymer. By utilizing the scattering-transmitting characteristics of the liquid crystal/polymer composite material, a liquid crystal display element capable of controlling directly ON and OFF of light without using a polarizing plate, was obtained, which is called as a dispersion type liquid crystal display element or a polymer dispersion type liquid crystal display element. The basic structure and a method of preparing the liquid crystal display element will be explained.

For the liquid crystal optical element, a nematic liquid crystal having a positive dielectric anisotropy is used wherein the refractive index of a polymer phase substantially coincides with the ordinary refractive index ($n_o$) of the liquid crystal. The liquid crystal/polymer composite material is interposed between a pair of substrates with electrodes.

The substrates with electrodes are such one made of glass, plastics, ceramics or the like on which transparent electrodes of a material such as ITO ($In_2O_3$—$SnO_2$), $SnO_2$ or the like is formed. A metallic electrode of a material such as Cr, Al or the like may be used in combination of the above-mentioned electrodes, if necessary. When the electrodes are used for a reflection type operation mode, they can be used as reflection electrodes.

The liquid crystal/polymer composite material is such one that the refractive index of liquid crystal in the liquid crystal/polymer composite material is changed depending on a state of whether or not a voltage is applied to. When the refractive index of the polymer phase substantially agrees with the refractive index of the liquid crystal, light is transmitted therethrough, and when the former does not agree with the later, light is scattered. Since no polarizing plate is used in the liquid crystal optical element, a bright display can be obtained in principle.

When a voltage is applied, liquid crystal molecules are orientated in parallel to the direction of electric field. Accordingly, it is easy to control the refractive indices, and a high transmittance is obtainable when the liquid crystal optical element is in a state of transmitting. A conventional example of a liquid crystal optical element using the liquid crystal/polymer composite material will be described.

Japanese Unexamined Patent Publication No. 271233/1988 (U.S. Pat. No. 4,834,509) (referred to as a conventional technique 1) discloses that a mixture of liquid crystal and a polymer material is produced by using a vinyl compound as a polymer material, specifically, an acryloyl compound containing an acryl urethane compound of high molecular weight, and the mixture is subjected to a photopolymerization phase separation process to form a liquid crystal phase and a polymer phase whereby a liquid crystal/polymer composite material of high performance can be formed. The publication also discloses that a light modulator of good appearance and high performance can be obtained by controlling light passing through the layer of liquid crystal/polymer composite material by turning-on or off an outer electric signal.

Japanese Unexamined Patent Publication No. 196229/1986 (referred to as a conventional technique 2) discloses as general description a liquid crystal display element formed by combining a liquid crystal/polymer composite material layer comprising polymer and liquid crystal with an active matrix substrate.

The active matrix substrate is composed of a substrate on which electrodes and active elements such as thin film transistors (TFTs), thin film diodes, metal-insulation material-metal non-linear resistor devices (MIMs) or the like are formed. A single of a plurality of active elements are connected to each pixel electrodes. A counter electrode substrate is composed of a substrate on which a common electrode or a patterned electrode is formed, and the counter electrode substrate is combined with the active matrix substrate so as to provide a display.

In a case of using a three-terminal element such as TFT as the active element, a solid electrode used in common with all picture elements may be disposed on the counter electrode substrate. In a case of using a two-terminal element such as an MIM element or a PIN diode or the like, the counter electrode substrate is applied with a stripe-like patterning.

Further, Japanese Unexamined Patent Publication No. 33523/1989 (referred to as a conventional technique 3) discloses that when a liquid crystal/polymer composite material is to be formed by photopolymerization, liquid crystal in the liquid crystal/polymer composite material is orientated in a certain direction by applying an electric field from the outside to thereby previously form a normally transparent portion or a semi-transparent portion. When it is desired to obtain a fixed display, such normal transparent portion can be formed.

Japanese Unexamined Patent Publication No. 134238/1993 (U.S. Pat. No. 5,235,445) (referred to as a conventional technique 4) discloses that in considering the elasticity of a polymer phase used, a polymer material having an elasticity of $3\times10^7$ N/m$^2$ or lower at 20° C. and $1\times10^3$ N/m$^2$ or more at 40° C. should be used. It also describes that control of the elasticity of the polymer phase contributes greatly to the reduction of the hysteresis, and a beautiful display without a residual image or an image-sticking can be obtained even when a moving picture is to be displayed.

The liquid crystal/polymer composite material can be prepared by an emulsion method, a latex method (removing solvent) or a polymerization-phase separation method (photo-setting, thermo-setting and so on). In the photopolymerization-phase separation method, particularly, polymer can be separated by photopolymerization from a mixture of a photocurable compound and liquid crystal so that a liquid crystal phase is separated from a polymer phase for a short time and a complicated interface can be formed in a three-dimensional space in a liquid crystal cell.

In the conventional liquid crystal optical element comprising a liquid crystal/polymer composite material, however, there was a problem that a large storage capacitance was needed and an aperture rate could not be increased since it had a low voltage holding ratio which is important to drive pixels at a high speed. In particular, there was a big problem in a case of active matrix driving to obtain a picture display of high gradation and high density at a high speed. Especially, there was limitation in choosing a photocurable compound used for the photopolymerization-phase separation method, and it was difficult to achieve simultaneously desired optical characteristics and excellent electric characteristics (i.e., voltage holding ratio).

It is an object of the present invention to provide a liquid crystal optical element provided with a liquid crystal/polymer composite material having excellent optical characteristics and electric characteristics, a liquid crystal display element using such liquid crystal optical element, and a projection type liquid crystal display apparatus using such liquid crystal display element.

In accordance with the first invention, there is provided a liquid crystal optical element comprising a pair of substrates with electrodes and a liquid crystal/polymer composite material interposed between the pair of substrates wherein polymer which constitutes a polymer phase has a maximum value of 20° C. or less in the temperature dependence of the loss dielectric constant (a frequency for measurement=100 Hz).

In accordance with the second invention, there is provided a liquid crystal optical element according to the first invention, wherein the polymer phase is a cured product of a photocurable type vinyl compound.

In accordance with the third invention, there is provided a liquid crystal optical element according to the second invention, wherein the photocurable type vinyl compound includes a hexamethylene or a hexamethylene having a side chain.

In accordance with the fourth invention, there is provided a liquid crystal optical element according to any one of the first invention through the third invention, wherein the polymer is swelled by 5–20 wt % in the presence of liquid crystal.

In accordance with the fifth invention, there is provided a liquid crystal optical element according to any one of the first invention through the fourth invention, wherein the polymer is a cured product of a mixture of at least two kinds of photocurable type vinyl compound having different molecular weights, and the ratio of the maximum molecular weight to the minimum molecular weight of photocurable type vinyl compounds is at least 1.5 times.

In accordance with the sixth invention, there is provided a liquid crystal optical element according to any one of the first invention through the fifth invention, wherein the refractive index of the polymer at the time of application of a voltage or at the time of application of non-voltage substantially coincide with the ordinary refractive index ($n_o$) or the extraordinary refractive index ($n_e$) of liquid crystal used.

In accordance with the seventh invention, there is provided a liquid crystal optical element according to any one of the first invention through the sixth invention, wherein an outer signal is applied across substrate electrodes to cause a change in an electric field passing through the liquid crystal/polymer composite material and to produce a non-saturated voltage value whereby a half tone display is effected.

In accordance with the eighth invention, there is provided a liquid crystal display element comprising an active matrix substrate, an opposing electrode substrate and a liquid crystal/polymer composite material for the liquid crystal optical element defined in any one of the first invention through the seventh invention, the liquid crystal/polymer composite material being interposed between the active matrix substrate and the opposing electrode substrate.

In accordance with the ninth invention, there is provided a projection type liquid crystal display apparatus comprising the liquid crystal display element defined in the eighth invention, a light source for projection and an optical system for projection.

In accordance with the tenth invention, there is provided a projection type liquid crystal display apparatus according to the ninth invention, wherein light from the light source for projection is split into color lights of R, G and B; the liquid crystal display element is arranged for each of the color lights; the color lights modified by the liquid crystal display elements are synthesized, and a full-color light of picture image is projected through the optical system for projection.

In accordance with the eleventh invention, there is provided a method of preparing a liquid crystal optical element comprising interposing a mixture of liquid crystal and a photocurable polymer material between a pair of substrates with electrodes, and curing the polymer material by polymerization-phase separation to thereby form a liquid crystal/polymer composite material comprising a polymer phase and a liquid phase, wherein the maximum value in the temperature dependence of the loss dielectric constant (a frequency for measurement=100 Hz) of a cured product of polymer constituting the polymer phase is 20° C. or less.

In accordance with the twelfth invention, there is provided a method of preparing a liquid crystal optical element according to the eleventh invention, wherein the refractive index of the polymer at the time of application of a voltage or at the time of application of non-voltage substantially coincides with the ordinary refractive index ($n_o$) or the extraordinary refractive index ($n_e$) of liquid crystal used.

In accordance with the thirteenth invention, there is provided a method of preparing a liquid crystal optical element according to the eleventh invention or the twelfth invention, wherein light is used for polymerization-phase separation.

By using the above-mentioned characteristic features of the present invention, a liquid crystal optical element having a high voltage holding ratio, a liquid crystal display element using the liquid crystal optical element and a projection type liquid crystal display apparatus of high performance using the liquid crystal display element can be obtained.

In the liquid crystal display element of the present invention, a liquid crystal/polymer composite material having an operation mode of transparent-scattering type, e.g., a liquid crystal/polymer composite material comprising liquid crystal and polymer (e.g., a cured product of a photocurable vinyl compound) is interposed between a pair of substrates with electrodes in the same manner as described with reference to the conventional techniques.

Specifically, the liquid crystal optical element of the present invention comprises a selected polymer material and liquid material so as to form a liquid crystal/polymer composite material having such a structure that these materials are phase-separated in a three-dimensional space. The liquid crystal/polymer composite material is interposed between the pair of substrates with electrodes. When a voltage is applied across the electrodes, the refractive index of the liquid crystal is changed, and the relation between the refractive index ($n_p$) of the polymer phase and the refractive index of the liquid crystal is changed.

As the structure in which the polymer and the liquid crystal are phase-separated in a three-dimensional space, there are a structure that liquid crystal is filled in a large number of fine holes formed in a polymer matrix, a structure that a continuous liquid crystal phase is impregnated in a polymer phase having a network form, a structure that a large number of microcapsules containing therein liquid crystal are dispersed in a polymer matrix, or a structure that liquid crystal phases which are phase-separated in a particle form are connected to each other in a three-dimensional space.

The above-mentioned structures of three-dimensional phase separation can generally be classified into a continuous liquid crystal phase structure wherein liquid crystal phases of 60–100% are connected to or communicated with each other through the polymer matrix, or a structure of phase separation wherein the proportion of the connected or communicated liquid crystal phases is 30% or less and the remaining liquid crystal phases are independent. In comparing these structures, use of the continuous liquid crystal phase structure is preferable in order to obtain a liquid crystal optical element having a high haze value and a high contrast ratio, because a light scattering effect caused between phase separated liquid crystal domains can be utilized.

In the present invention, a polymer material having a maximum value of 20° C. or less in the temperature dependence of the loss dielectric constant (frequency of measurement=100 Hz) is selected. In particular, it is preferable to use a polymer material having a maximum value lower than the lowest temperature of use whereby a high voltage holding ratio can be realized as a liquid crystal optical element. Further, it is preferable to use a polymer material having a maximum value in the temperature dependence of the loss dielectric constant being −10° C. or less since it is usable in a further low temperature region.

A cured product of a photo-setting or a thermo-setting compound is preferably used for the polymer material since it can form a polymer phase in a closed system. In particular, the photo-setting compound is preferable since it can be cured in a short period of time with little influence of heat.

As a specific method for preparing the liquid crystal/polymer composite material, an empty cell is formed by using a sealing material, and a mixture of liquid crystal and a curable compound is injected through an injection port in the same manner as in the conventional technique. After sealing the injection port, the curable material is cured by light irradiation or heating. A sealing material may be coated on the peripheral portion of the assembly to seal the peripheral portion. According to this method, since it is only required to supply the uncured mixture of the liquid crystal and the curable compound by means of coating such as roll coating, spin coating, printing or by using a dispenser or the like, the injection step can be simple and producibility is very high.

The relation between the voltage holding ratio and the liquid crystal/polymer composite material in the present invention, specifically, the relation between the voltage holding ratio and the liquid crystal/polymer composite material using a cured product of a curable compound will be described.

In the conventional liquid crystal/polymer composite material, the voltage holding ratio was low in active matrix driving whereby a large storage capacitance was required and the transmittance of the panel was decreased.

As causes for reducing the voltage holding ratio of the liquid crystal/polymer composite material, there are the reduction of the DC specific resistance due to ionized residual impurities and the dielectric relaxation of the polymer forming the polymer phase. The reduction of the voltage holding ratio due to the dielectric relaxation of the polymer is an unique phenomenon in the liquid crystal/polymer composite material, which is considered to occur due to a micro-Brownian motion/a local motion of the backbone of the polymer and the motion of a long side chain.

Accordingly, in order to obtain a high voltage holding ratio in a practical temperature range, it is preferable that the position of the maximum value of the loss dielectric constant (frequency of measurement=100 Hz) of the polymer forming a polymer phase takes a sufficiently lower temperature than a usable temperature region. Generally, a temperature of 20° C. or less is preferable. In the description here, the polymer means a polymer itself without including liquid crystal.

The polymer portion in the polymer phase may be composed only of a polymer material forming the polymer or a polymer material swollen by liquid crystal. When the polymer material is swollen by liquid crystal, the maximum value of the loss dielectric constant of the liquid crystal/polymer composite material will shift to a lower temperature region than that of the polymer material without swelling. Accordingly, by utilizing a swelling effect by liquid crystal, the temperature of the maximum value of the loss dielectric constant with respect to temperature dependence can be shifted to a lower temperature side. An amount of liquid crystal for swelling the polymer phase depends on a liquid crystal material used and the kind of polymer material, and a swelling amount of 0—several 10 wt % can be taken to the total amount of the polymer.

On the other hand, by introducing —$(CH_2)_6$— (a hexamethylene structure), —$CH_2C(CH_3)_2CH_2CH(CH_3)$ $CH_2CH_2$— (an example of a hexamethylene structure having a side chain) or —$(Si(CH_3)_2—O—)_n$— (a polysiloxane structure) into the polymer, it is possible to lower the glass transition temperature of the polymer, namely, the temperature at which the loss dielectric constant of the polymer reaches a maximum. Such a structure may be introduced into a part of the polymer to be used.

Further, in order to control the size of liquid crystal domains or particles in the liquid crystal/polymer composite material, the domain or particle size distribution and the domain or particle density, it is preferable to use a mixture of at least two curable compounds having different molecular weights. The ratio of the highest molecular weight to the lowest molecular weight of theirs is preferably at least 1.5.

By the use of the polymer having the above-mentioned physical property, it is possible of reduce the hysteresis, like in conventional technique 3.

As a concrete producing method, there is a technique that a curable compound which will meet the above-mentioned range of the physical property after curing and a liquid crystal material are uniformly dissolved, and the material for the polymer is cured to form a phase-separated structure of the liquid crystal and the polymer phase. In this case, the balance of compatibility of the system before and after the curing and the characteristics of the polymer phase can be controlled by appropriately incorporating another curable compound, a reaction initiator and so on. In particular, it is preferable to use a photosetting vinyl compound and form the phase-separated structure by irradiation with light both in view of the control of the structures of the liquid crystal phase and the polymer phase and in view of productivity. In this case, as the photosetting vinyl compound, (meth)acrylic compounds, particularly, those having an acryloyl group as the curing site, are preferred.

In order to improve the scattering property when no electric field is applied, it is effective to increase the volume fraction $\Phi$ of the liquid crystal which is operable in the liquid crystal/polymer composite material. Specifically, it is preferable that $\Phi > 40\%$. On the other hand, when the value $\Phi$ is excessively high, the stability in structure of the liquid crystal/polymer composite material becomes inferior. Accordingly, it is preferable that $\Phi \leq 90\%$. It is particularly preferable that $55\% \leq \Phi \leq 75\%$ to form a continuous liquid crystal phase and a continuous polymer phase as described above.

In the present invention, when a photosetting compound is used as a material for the polymer in the liquid crystal/polymer composite material as described above, it is preferable to use a photosetting vinyl compound. Specifically, a photosetting acrylic compound is preferred. For example, an alkyl acrylate, alkylene glycol diacrylate, a polyacrylate of a polyether polyol or an acrylurethane obtainable by using a polyether polyol may be used.

As the photosetting vinyl compound, it is preferable to use a compound having a relatively high molecular weight and a compound having a relatively low molecular weight in combination. As the compound having a relatively low molecular weight, an alkyl acrylate, a hydroxyalkyl acrylate or an alkylene glycol diacrylate may, for example, be mentioned. Although the molecular weight of it is not particularly limited, it is preferably at most 500, more preferably at most 300.

As the photosetting compound having a relatively high molecular weight, an acrylurethane or an acrylate obtained by using a polyol having a relatively high molecular weight such as a polyether polyol, a polyester polyol or a polycarbonate polyol is preferred. Particularly preferred is an acrylurethane. An acrylurethane containing a hexamethylene structure can be obtained by using an isocyanate having the above-mentioned hexamethylene structure such as hexamethylene diisocyanate or trimethylhexamethylene diisocyanate as a starting material.

Although the molecular weight of the photosetting vinyl compound having a relatively high molecular weight is not particularly limited, it is preferably at least 600, more preferably at least 1,000. When a compound having a relatively high molecular weight and a compound having a relatively low molecular weight are used in combination, the ratio of the highest molecular weight to the lowest molecular weight of theirs is preferably at least 1.5, more preferably at least 3.

When a photocurable compound is used in the present invention, it is preferable to uniformly dissolve liquid crystal in the photocurable compound. A cured product after exposure to light is not dissolved or is hardly dissolved to the liquid crystal. When a composition of liquid crystal is used, it is desirable to use elements of liquid crystal each having a closer value in solubility.

In the present invention, since liquid crystal is used as solvent, and the photocurable compound is cured by exposure to light in forming the liquid crystal/polymer composite material, it is unnecessary to evaporate solvent or water which is useless at the time of curing. Further, since the photocurable compound is cured in a closed system, a conventional injection method to inject the compound in a liquid crystal cell can be employed whereby reliability can be increased. Further, when the photocurable compound is used, two substrates can be bonded to each other, which further increases reliability.

The liquid crystal optical element provided with the liquid crystal/polymer composite material is used as a display element observed mainly by a human. It is also used as a light modulating window or an optical shutter by using a solid electrode or a driving method such as simple matrix. Further, the liquid crystal optical element can be used either for a direct view type display element or a projection type display element. In a case of using it as the direct view type display element, a display apparatus is constituted in combination of a backlight, a lens, a prism, a mirror, a diffusion plate, a light absorbing material, a color filter and so on depending on desired display characteristics.

Further, an infrared ray cut filter or a UV ray cut filter or the like may be laminated, or a character, a figure or the like may be printed. Further, a plurality of liquid crystal optical elements may be used in combination.

When the liquid crystal optical element is used as a light modulator, a protective plate such as a glass plate, a plastic plate or the like is laminated at an outer side of the liquid crystal optical element, whereby there is a small possibility of breakage even when the surface of the liquid crystal optical element is compressed. This improves safety.

Figure 2:
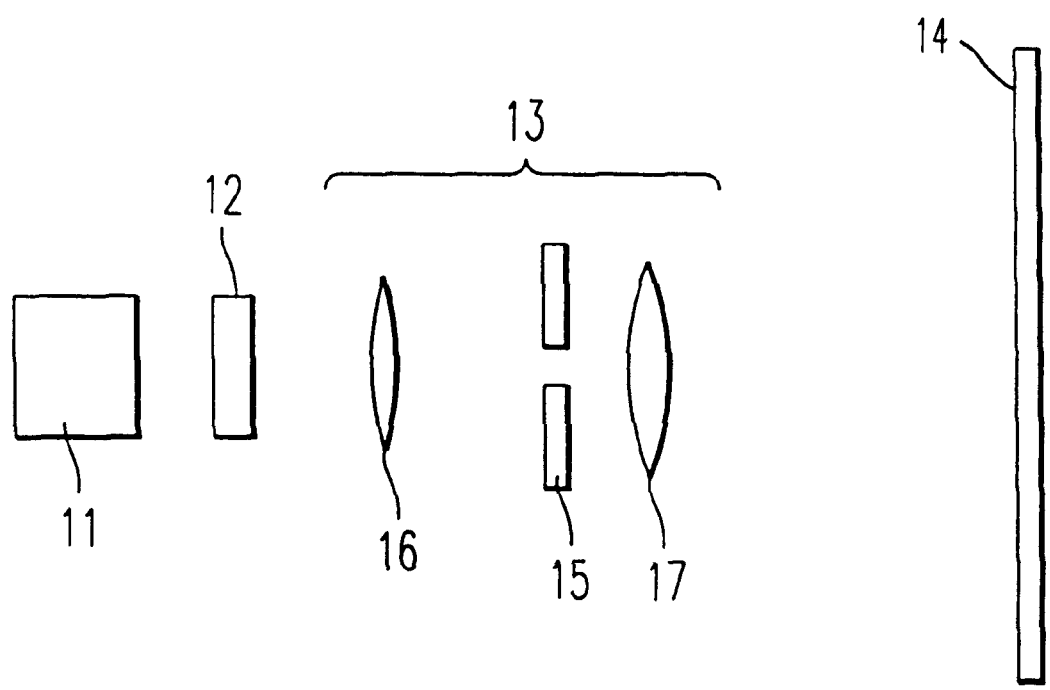
Figure 3:
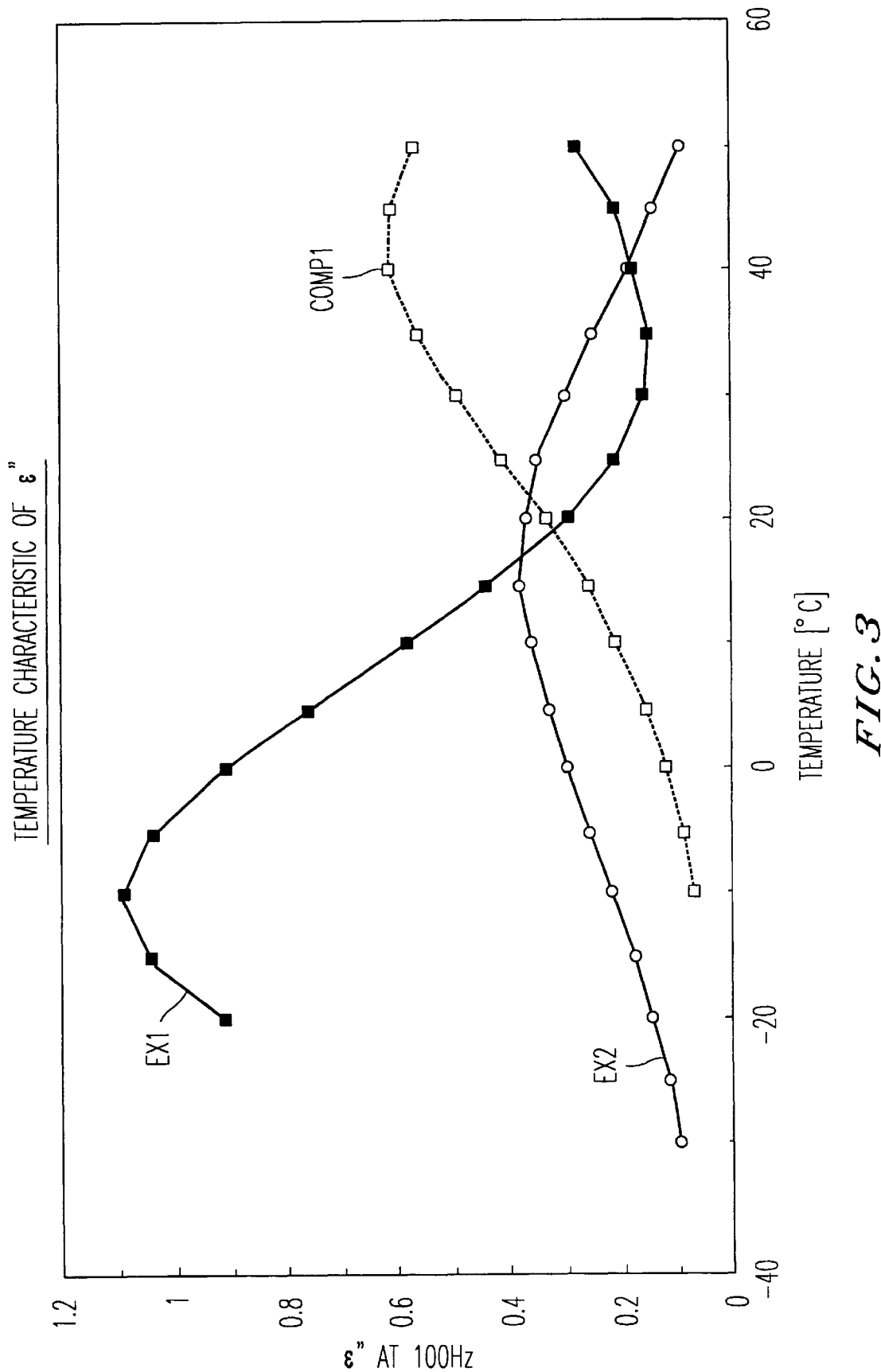

In drawings,

FIG. 1 is a cross-sectional view showing an embodiment of the liquid crystal display element according to the present invention, FIG. 2 is a diagram showing an embodiment of the projection type liquid crystal display apparatus according to the present invention, and FIG. 3 is a graph showing the temperature characteristic of $\epsilon''$.

An embodiment of the liquid crystal display element of the present invention will be described in more detail with reference to the drawings.

FIG. 1 shows an embodiment of the liquid crystal display element of the present invention wherein an active matrix substrate is used. In FIG. 1, reference numeral 1 designates a liquid crystal display element, numeral 2 designates a substrate such as glass, plastics or the like which is used as an active matrix substrate, numeral 3 designates a transparent pixel electrode such as ITO, $SnO_2$ or the like, numeral 4 designates an active element such as TFT, a diode, a non-linear resistance element or the like, numeral 5 designates a substrate such as glass, plastics or the like which is used as a counter electrode substrate, numeral 6 designates a transparent counter electrode such as ITO, $SnO_2$ or the like, and numeral 7 designates a liquid crystal/polymer composite material interposed between the substrates. When a full color display is to be effected in a single plate type liquid crystal display element, color filters for RGB and/or a black mask is used.

FIG. 2 is a diagram showing an embodiment of a projection type liquid crystal display apparatus using the liquid crystal display element in FIG. 1. In FIG. 2, numeral 11 designates a light source for projection, numeral 12 designates the liquid crystal display element in FIG. 1, numeral 13 designates an optical system for projection including a lens, an aperture and so on, and numeral 14 designates a projection screen for projecting light. In this case, the projection optical system includes an aperture or a spot 15 which is constituted by a hollowed plate, a condensing lens 16 and a projection lens 17.

FIG. 2 shows an embodiment of the projection type liquid crystal display apparatus of single plate type. However, the present invention is applicable to another system comprising three plates for R, G and B as disclosed in Japanese Unexamined Patent Publication No. 134295/1995 (a transparent type) or Japanese Unexamined Patent Publication No. 5419/1995 (a reflection type). In this case, light from a white color light source is splitted to color lights of R, G and B; a liquid crystal display element is used for each of the color lights, and the color lights are synthesized, whereby efficiency of utilization of light is improved. For instance, when a projection type liquid crystal display apparatus is prepared by using three liquid crystal display elements so that each of the color lights of R, G and B is passed through each of the liquid crystal display elements, the particle size or the domain size of the liquid crystal, the substrate gap, the refractive index of the liquid crystal should be adjusted for each of the color lights so that the characteristics be met for each of the color light.

The liquid crystal used for the liquid crystal/polymer composite material may be a nematic liquid crystal or a smectic liquid crystal. In particular, the nematic liquid crystal is preferably used. Further, a cholesteric liquid crystal may be added, or a dichroic dye or a single coloring matter may be added. Further, viscosity controllers, spacers such as alumina particles, ceramic particles, plastic particles, glass fibers or the like, pigments, dyes, or any other additives which do not adversely influence to the performance of the present invention can be added.

In the present invention, determination is so made that $n_p$ of the polymer phase after curing agrees with $n_o$ of the liquid crystal used in a state of application of voltage. Then, light is transmitted when the refractive index of the polymer phase agrees with the refractive index of the liquid crystal, while the light is scattered (opaque) when they do not agree with each other. The transmittance of light in a transmitting state of the liquid crystal optical element using the liquid crystal/polymer composite material is high. Further, the haze value in a scattering state can be 80% or more.

EXAMPLE 1

A bifunctional acrylurethane which was a reaction product of a polypropyrene glycol having a molecular weight of about 1,000, 2,2,4-trimethyl-1,6-diisocyanatohexane and 2-hydroxyethylacrylate (2-HEA), 2-ethylhexyl acrylate (2-EHA) and 4-hydroxybutyl acrylate (4-HBA) were mixed in a weight ratio of 7:1:2 to prepare a composition of the photosetting compounds.

Further a small amount of polymerization initiator was added, and to the mixture, a nematic liquid crystal having a positive dielectric anisotropy wherein it has physical properties of $\Delta n=0.22$, $\Delta\epsilon=12$, $K_{33}=1.3\times10^{-11}$N and $\eta=25$cSt at 25° C. and an AC specific resistance of $5\times10^{11}\Omega\cdot$cm at 20° C. and 30 Hz was uniformly dissolved to have a liquid crystal content of 65 wt %.

Electrode substrates on which solid ITO electrodes were sealed at their peripheral portions with use of a sealing material to prepare an empty cell having an electrode substrate gap of 13 μm. In the empty cell, spacers having a diameter of 13 μm were dispersed to form a constant gap. The above-mentioned curable mixture was injected to the cell, and it was exposed to UV rays to cure the mixture to thereby form a liquid crystal/polymer composite material. Then, the injection port is sealed with an epoxy type adhesive agent. The voltage holding ratio of the liquid crystal display element was measured. Specifically, a voltage of 5 V ($V_{in}$) having a pulse width of 60 μsec was applied to the cell in a constant temperature bath of 30° C., and a waveform with voltage reduction by the cell was measured by a digital oscilloscope. The voltage holding ratio can be expressed by a ratio of a holding voltage ($V_{end}$) after 16.67 msec to an applied voltage in percentage. A result of measurement is shown in Table 1.

A mixture excluding the liquid crystal from the above-mentioned mixture was prepared. The mixture was injected into a cell prepared in the same manner as above. The mixture was cured by UV ray exposure. The cell was put into the constant temperature bath, and the temperature dependence with respect to the loss dielectric constant $\epsilon''$ at 100 Hz of the mixture was obtained by measuring the conductance G of the cell with use of an impedance analyzer (model 4192A by Hewlett-Packard Co.). The relation of the conductance G to the loss dielectric constant $\epsilon''$ is shown in formula 1 (relative loss dielectric constant):

$$\epsilon''=G\times d/(2\times\pi\times f\times\epsilon_0\times S)$$

where d: cell gap, f: frequency, $\epsilon_0$: dielectric constant in vacuum and S: surface area of electrode. As a result, the temperature at the maximum value of the loss dielectric constant at a measuring frequency=100 Hz was about −10° C.

EXAMPLE 2

A bifunctional acrylurethane "M1200" manufactured by Toagosei Chemical Industry Co., Ltd. and 2-EHA were mixed in a weight ratio of 1:1 to prepare a photosetting mixture. To the mixture, a slight amount of the same photopolymerization initiator as in Example 1 was added. In the mixture, the same liquid crystal was uniformly dissolved in the same ratio as in Example 1. Then, a liquid crystal/polymer composite material was formed in the same manner as in Example 1 and the voltage holding ratio at 30° C. was measured in the same manner as in Example 1.

Then, an uncured polymer composition in which liquid crystal was removed from the uncured mixture was prepared. The uncured polymer composition was injected into a cell prepared in the same manner as above, and the mixture was cured by exposure to UV rays. The temperature at the maximum value of the loss dielectric constant was measured in the same manner as in Example 1. As a result, the temperature was 15° C.

COMPARATIVE EXAMPLE 1

A bifunctional acrylurethane "M1200" manufactured by Toagosei Chemical Industry Co., Ltd., 2-EHA and 4-HBA were mixed in a weight ratio of 7:1:2 to prepare a photosetting mixture. By using the photosetting mixture, a liquid crystal/polymer composite material was prepared in the same manner as in Example 1. The voltage holding ratio at 30° C. was measured in the same manner as in Example 1.

Then, an uncured polymer composition in which liquid crystal was removed from the mixture of the photocurable compound was prepared. The composition was injected into a cell prepared in the same manner as above, and the mixture was cured by exposure to UV rays. The temperature at the maximum value of the loss dielectric constant was measured in the same manner as in Example 1. As a result, the temperature was 43° C.

Results of the measurement concerning Example 1, Example 2 and Comparative Example 1 are shown in Table 1 and FIG. 3. It is found that in the liquid crystal/polymer composite materials, the maximum value of the loss dielectric constant of each of the polymers which forms a polymer phase can be shifted to a lower temperature side with respect to a usable temperature range, whereby the voltage holding ratio can be increased.

TABLE 1

|  | Example 1 | Example 2 | Comparative Example 1 |
|---|---|---|---|
| Maximum temperature of loss dielectric constant (° C.) | −10 | +15 | 43 |
| Voltage holding ratio (%) | 83.8 | 92.4 | 64.8 |

In accordance with the present invention, a high voltage holding ratio which could not be obtained in the conventional liquid crystal/polymer composite material is obtainable, whereby a practically useful liquid crystal optical element, a liquid crystal display element or a projection type liquid crystal display apparatus can be provide. Specifically, a liquid crystal TV projector which can be used for a conventional TV using a cathode ray tube or a data projector can be provided.

In other words, in the present invention, a predetermined performance can be achieved even when a picture having a high density is to be displayed at a high speed, a bright picture image of high contrast ratio is projected, and continuous operations are possible.

Further, an optical shutter element of high speed can be provided. Further, the present invention is applicable to a display element for an electronic device of outdoor use which requires a wide temperature range for use. For instance, the present invention is applicable to a display apparatus for a potable data terminal for an automobile. Further, the liquid crystal display element of the present invention provides flexibility in designing of TFT; the aperture rate in a display region can be increased, and the transmittance of light can be determined to be high in comparison with the conventional technique. In the liquid crystal optical element provided with a liquid crystal/polymer composite material formed by a photopolymerization-phase separation method, both requirements of having excellent optical characteristics and electric characteristics can be achieved.

In the present invention, various applications are possible so long as the effect by the present invention is not reduced.

What is claimed is:

1. A liquid crystal optical element comprising a pair of substrates with electrodes and a liquid crystal/polymer composite material interposed between the pair of substrates wherein polymer which constitutes a polymer phase in said liquid crystal/polymer composite material has a maximum loss dielectric constant at a temperature of 20° C. or less when measured at 100 Hz and said polymer is obtained from photocurable compounds comprising photocurable monomers, wherein the photocurable monomers have molecular weights of 144 to 500.

2. A liquid crystal optical element according to claim 1, wherein the polymer is swelled by 5–20 wt % in the presence of liquid crystal.

3. A liquid crystal optical element according to claim 1, wherein the polymer is a cured product of a mixture of at least two different photocurable vinyl compounds having different molecular weights, and the ratio of the higher molecular weight to the lower molecular weight of photocurable vinyl compounds is at least 1.5.

4. A liquid crystal optical element according to claim 1, wherein the refractive index of the polymer at the time of application of a voltage or at the time of application of non-voltage substantially coincide with the ordinary refractive index ($n_o$) or the extraordinary refractive index ($n_e$).

5. A liquid crystal optical element according to claim 1, wherein an outer signal is applied across substrate electrodes to cause a change in an electric field passing through the liquid crystal/polymer composite material and to produce a non-saturated voltage value whereby a half tone display is effected.

6. A liquid crystal display element comprising an active matrix substrate, an opposing electrode substrate and a liquid crystal/polymer composite material for the liquid crystal optical element defined in claim 1, the liquid crystal/polymer composite material being interposed between the active matrix substrate and the opposing electrode substrate.

7. A projection liquid crystal display apparatus comprising the liquid crystal display element defined in claim 6, a light source for projection and an optical system for projection.

8. A projection liquid crystal display apparatus according to claim 7, wherein light from the light source for projection is split into color lights of R, G and B; the liquid crystal display element is arranged for each of the color lights; the color lights modified by the liquid crystal display elements are synthesized, and a full-color light of picture image is projected through the optical system for projection.

9. A liquid crystal optical element according to claim 2, wherein the polymer is a cured product of a mixture of at least two different photocurable vinyl compounds having different molecular weights, and the ratio of the higher molecular weight to the lower molecular weight of photocurable vinyl compounds is at least 1.5.

10. The liquid crystal optical element as claimed in claim 1, wherein said photocurable compounds further comprise a photocurable oligomer having a molecular weight that is at least 1.5 times higher than said photocurable monomers molecular weight.

11. The liquid crystal optical element as claimed in claim 1, wherein at least one of said photocurable monomers has a chemical structure containing a hexamethylene group with no side chains, a hexamethylene group with one or more side chains or a polysiloxane group.

12. The liquid crystal optical element as claimed in claim 1, wherein said photocurable monomers are one or more members selected from the group consisting of alkyl acrylates, hydroxyalkyl acrylates and alkylene glycol diacrylates.

13. The liquid crystal optical element as claimed in claim 10, wherein said photocurable oligomer is a bifunctional acrylurethane.

* * * * *

UNITED STATES PATENT AND TRADEMARK OFFICE
CERTIFICATE OF CORRECTION

PATENT : 6,017,466

DATED : January 25, 2000

INVENTOR(S) : Yohsuke FUJINO et al.

It is certified that error appears in the above-identified patent and that said Letters Patent is hereby corrected as shown below:

On the title page, item [30], the Foreign Application Priority Data is incorrectly listed. It should be:

--[30] Foreign Application Priority Data

Jun. 30, 1995  [JP]  Japan...............7-166053--

Signed and Sealed this

Fifteenth Day of May, 2001

*Attest:*

NICHOLAS P. GODICI

*Attesting Officer*     *Acting Director of the United States Patent and Trademark Office*